United States Patent [19]

Simic

[11] 4,348,233

[45] Sep. 7, 1982

[54] PLASTICIZED SULFUR COMPOSITION

[75] Inventor: Milutin Simic, Novato, Calif.

[73] Assignee: Chevron Research Company, San Francisco, Calif.

[21] Appl. No.: 255,084

[22] Filed: Apr. 17, 1981

[51] Int. Cl.$^3$ .......................... C09D 5/18; C09K 3/28
[52] U.S. Cl. ............................ 106/18.23; 106/18.24; 106/287.24; 106/287.32
[58] Field of Search ............ 106/18.24, 18.23, 287.32, 106/287.24; 568/639

[56] References Cited

U.S. PATENT DOCUMENTS

| 3,440,064 | 4/1969 | Ludwig | 106/287.32 |
| 4,026,719 | 5/1977 | Simic | 106/287.17 |
| 4,129,453 | 12/1978 | Simic | 106/287.32 |
| 4,284,682 | 8/1981 | Frosch | 106/18.24 |

Primary Examiner—Theodore Morris
Attorney, Agent, or Firm—D. A. Newell; T. G. De Jonghe; C. J. Caroli

[57] ABSTRACT

A plasticized sulfur composition having improved flame retardancy and crazing resistance, comprising at least 50% by weight sulfur, a sulfur plasticizer, decabromodiphenyl oxide and an inorganic filler. Preferably, the composition also contains dicyclopentadiene.

9 Claims, 2 Drawing Figures

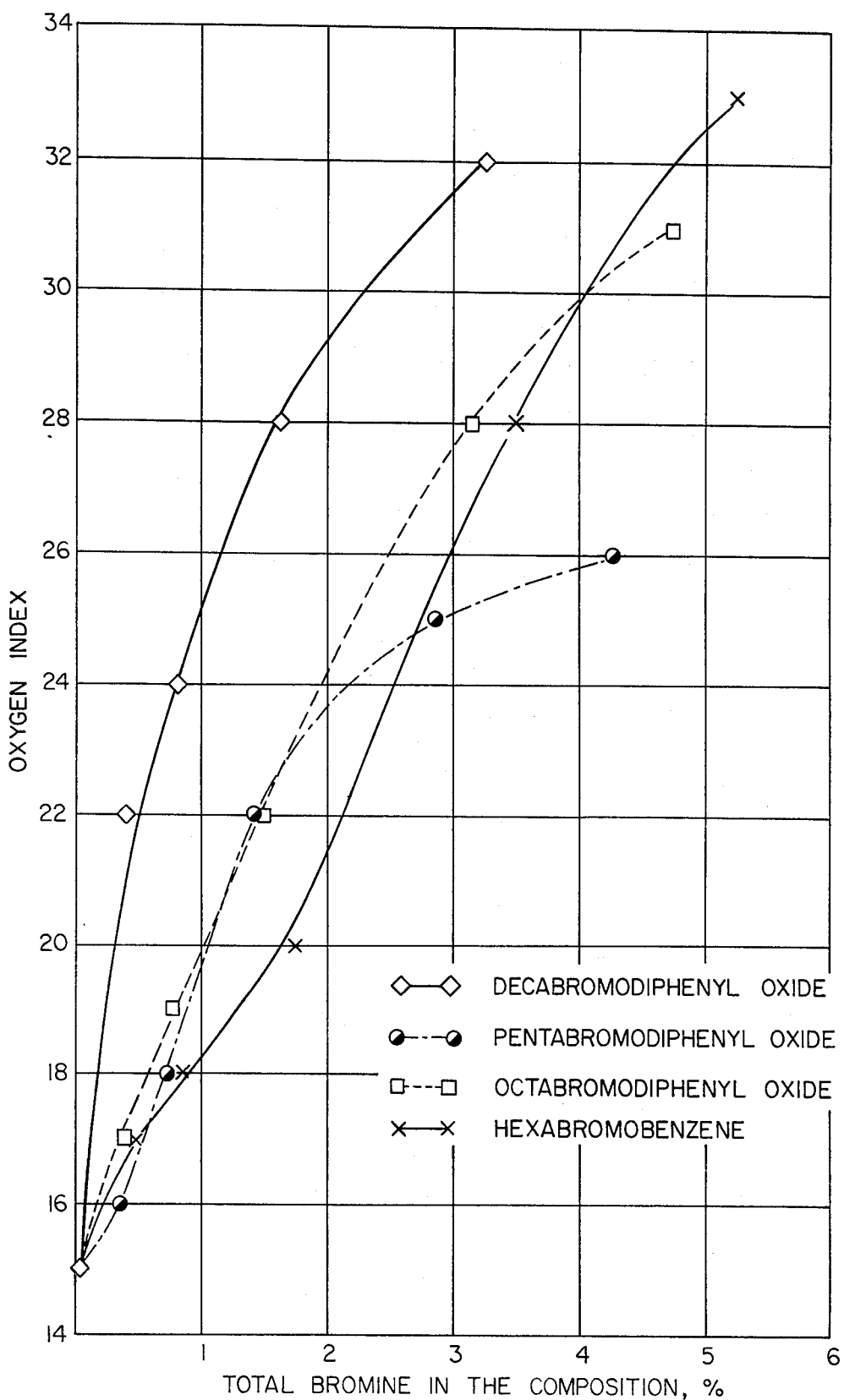
FIG._1.

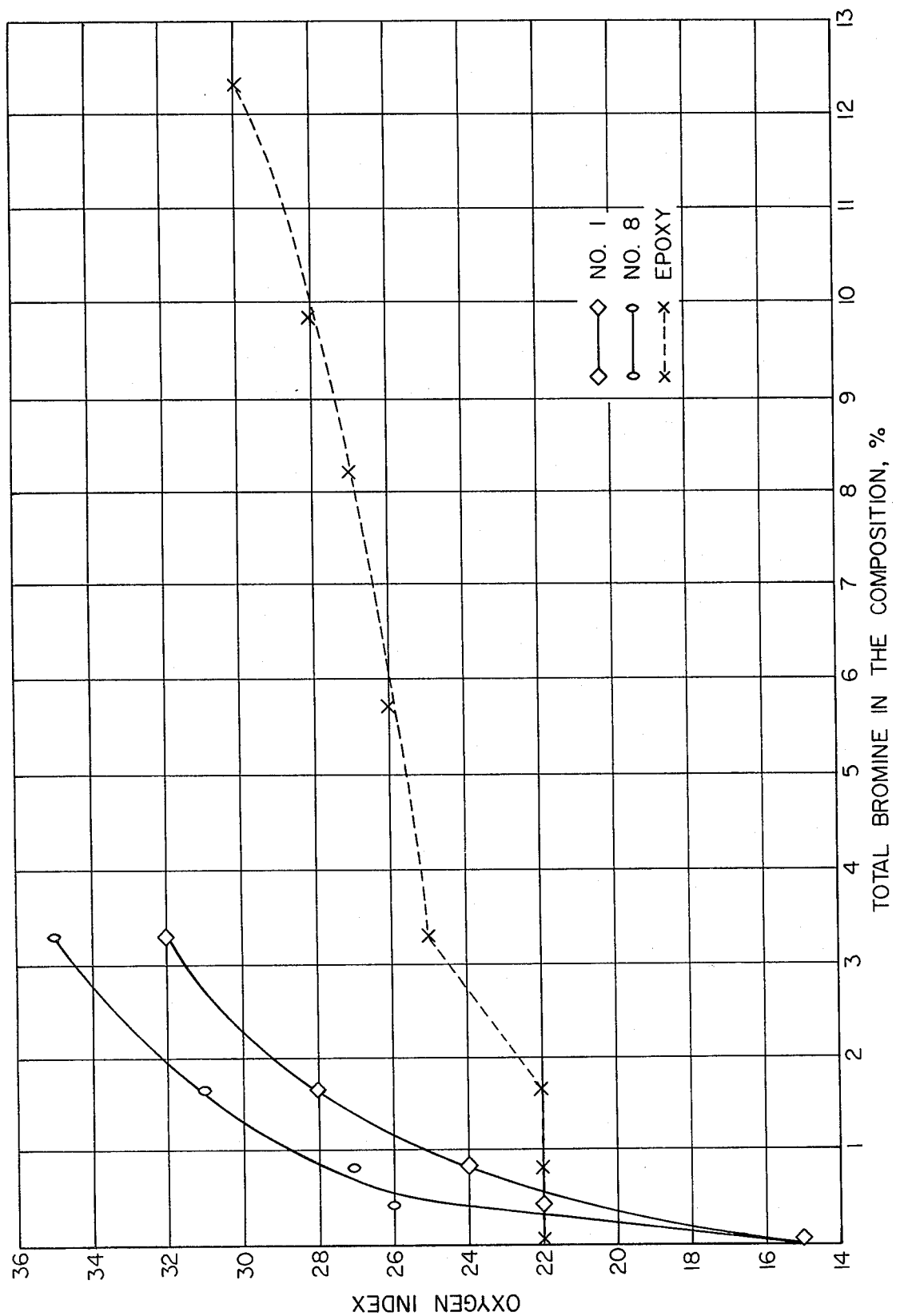
FIG._2.

PLASTICIZED SULFUR COMPOSITION

BACKGROUND OF THE INVENTION

The composition of this invention is a plasticized sulfur coating comprising at least 50% by weight sulfur. The invention concerns the use of decabromodiphenyl oxide to improve the flame retardancy and the crazing resistance of the plasticized sulfur coating. The composition preferably contains dicyclopentadiene to further improve flame retardancy and to suppress hydrogen sulfide odors during the formulation of the sulfur compositions disclosed herein.

Plasticized sulfur-based coating compositions are well known. Generally, they comprise at least 50% by weight sulfur, a sulfur plasticizer, and a filler. For instance, U.S. Pat. No. 4,026,719 granted May 31, 1977 to Simic describes plasticized sulfur coating compositions comprising sulfur, a plasticizer, and a mineral filler. In addition, U.S. Pat. No. 4,026,719 summarizes several articles and other patents which teach various plasticized sulfur compositions comprising sulfur, a plasticizer, and a filler.

In addition to the three principal ingredients, plasticized sulfur coating compositions may also comprise dyes or pigments, aggregate such as gravel, rock, or sand or the like. Each of these additional optional ingredients adapts the coating to a particular use. For instance, the addition of sand to a typical plasticized sulfur coating provides a textured appearance particularly desirable when the coating is applied as a surface bonding material on the exterior of a building. Gravel or rock is used to adapt the plasticized sulfur coating for use as roadbed coating similar to concrete or asphalt.

SUMMARY OF THE INVENTION

According to the present invention, a composition is provided which comprises at least 50% by weight sulfur, a sulfur plasticizer, decabromodiphenyl oxide and an inorganic filler. Preferably, the composition also contains dicyclopentadiene.

Among other factors, the present invention is based on my finding that the use of decabromodiphenyl oxide provides a plasticized sulfur composition with both improved flame retardancy and improved crazing resistance. This is particularly surprising in view of the fact that flame retardant additives generally do not improve resistance to crazing. In addition, I have found that the incorporation of small amounts of dicyclopentadiene further enhances the flame retardancy of the present composition and suppresses the odor of hydrogen sulfide gas during the formulation of the composition.

Sulfur is the major ingredient of the composition of this invention, and is present in amounts of at least 50% by weight of the composition. Preferably, the amount of sulfur in the composition varies from about 60% by weight to about 98% by weight of the composition. Especially preferred amounts of sulfur range from about 70% by weight to about 97% by weight of the composition. The sulfur may be present in the composition as the result of either the addition of free sulfur or the addition of a sulfur plasticizer already comprising sulfur. For instance, as detailed below, the aromatic polysulfides are one class of preferred plasticizers. Aromatic polysulfide can be prepared by the reaction of excess sulfur with a reactive aromatic compound. Thus, the resulting plasticizer is a reaction product comprising excess unreacted sulfur and a sulfur bridged polyaromatic. For purposes of determining the sulfur content of the composition of this invention, both the unreacted sulfur and the incorporated sulfur of the sulfur bridged polyaromatic are included.

The composition of this invention includes a sulfur plasticizer which is present in amounts ranging from about 0.05% by weight to about 25.0% by weight of the composition. Preferably, the amount of sulfur plasticizer ranges from about 0.2% by weight to about 5.0% by weight of the composition. Most preferably, the plasticizer is present in an amount between about 1.0% by weight and 4.0% by weight of the composition.

As conventionally understood and as used herein, the term "sulfur plasticizer" includes materials or mixtures of materials which, when added to sulfur, lower its melting point and increase its crystallization time. One useful way to measure the rate of crystallization is as follows: The test material (0.040 g) is melted on a microscope slide at 130° C. and is then covered with a square microscope slide cover slip. The slide is transferred to a hot plate and is kept at a temperature of 70°±2° C., as measured on the glass slide using a surface pyrometer. One corner of the melt is seeded with a crystal of test material. The time required for complete crystallization is measured. Plasticized sulfur, then, is sulfur containing an additive which increases the crystallization time with experimental error, i.e., the average crystallization time of the plasticized sulfur is greater than the average crystallization time of the elemental sulfur feedstock. For the present application, plasticizers are those substances which, when added to molten elemental sulfur, cause an increase in crystallization time in reference to the elemental sulfur itself.

Inorganic plasticizers include iron, arsenic and phosphorus sulfides, but the particularly preferred plasticizers are organic compounds which react with sulfur to give sulfur-containing materials.

Sulfur plasticizers which are suitable include aliphatic polysulfides, aromatic polysulfides, styrene, dicyclopentadiene, dioctylphthalate, acrylic acid, epoxidized soybean oil, triglycerides, and tall oil fatty acids.

One class of preferred plasticizers is the aliphatic polysulfides, particularly those that will not form crosslinking. Thus, butadiene is not a preferred constituent to form the aliphatic polysulfide, as it may form cross-linking sulfur bonds, whereas dicyclopentadiene is a preferred compound for forming the aliphatic polysulfide useful as the sulfur plasticizer. With molten sulfur, dicyclopentadiene forms an extremely satisfactory aliphatic polysulfide.

Another class of preferred plasticizers for use in the composition of the present invention are aromatic polysulfides formed by reacting one mol of an aromatic carbocyclic or heterocyclic compound, substituted by at least one functional group of the class -OH or -NHR in which R is H or lower alkyl with at least two mols of sulfur.

Suitable aromatic compounds of this type include: phenol, aniline, N-methyl aniline, 3-hydroxy thiophene, 4-hydroxy pyridine, p-aminophenol, hydroquinone, resorcinol, meta-cresol, thymol, 4,4'-dihydroxy biphenyl, 2,2-di(p-hydroxyphenol) propane, di(p-hydroxyphenyl) methane, etc., p-phenylene diamine, methylene dianiline. Phenol is an especially preferred aromatic compound to form the aromatic polysulfide.

The aromatic polysulfides are generally prepared by heating sulfur and the aromatic compound at a temperature in the range of 120° to 170° C. for 1 to 2 hours, usually in the presence of a base catalyst such as sodium hydroxide. (See for example, Angew, Chem. Vol. 70, No. 12, pages 351-67 (1958), the polysulfide product made in this way has a mol ratio of aromatic compound-:sulfur of the 1:2 to 1:10, preferably from 1:3 to 1:7. Upon completion of the reaction, the caustic catalyst is neutralized with an acid such as phosphoric or sulfuric acid. Organic acids may also be used for this purpose. The resulting aromatic polysulfide may be used immediately or it may be cooled and stored for future use.

Another type of aliphatic polysulfide useful as a plasticizer for this invention are the linear aliphatic polysulfides. Although these polysulfides may be used alone as the sulfur plasticizer, it is preferred to use them in combination with either (a) dicyclopentadiene or (b) the aromatic polysulfides described above, especially with the phenol-sulfur adduct. In this connection, the preferred plasticizer mixtures contain from 5 to 60% linear aliphatic polysulfide by weight based on total plasticizer, preferably about 20 to 50 weight percent.

These aliphatic polysulfides may have branching indicated as follows:

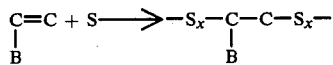

wherein x is an integer of from 2 to 6 and wherein B is H, alkyl, aryl, halogen, nitrile, ester or amide group. Thus, in this connection, the aliphatic polysulfide is preferably a linear polysulfide. The chain with the sulfur preferably is linear, but it can have side groups as indicated by B above. Also, this side group B may be aromatic. Thus, styrene can be used to form a phenyl substituted linear aliphatic polysulfide. The preferred aliphatic polysulfides of this type are both linear and non-branched.

Unbranched linear aliphatic polysulfides include those such as Thiokol LP-3 which contains an ether linkage and has the recurring unit:

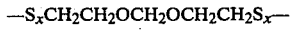

wherein x has an average value of about 12. The ether constituent of this aliphatic polysulfide is relatively inert to reaction. Other suitable aliphatic polysulfides have the following recurring units:

—$S_x$—$(CH_2)_y$—$S_x$— from reaction of alpha, omega-dihaloalkanes and sodium polysulfide;
—$S_x$—$(CH_2CH_2$—S—$CH_2CH_2)$—$S_x$— from reaction of alpha, omega-dihalosulfides and sodium polysulfide;
—$S_x$—$(CH_2CH_2$—O—$CH_2CH_2)$—$S_x$— from reaction of alpha, omega-dihaloesters and sodium polysulfide wherein x is an integer of 2 to 5; and y is an integer of 2 to 10.

Preferably, the composition also contains a filler ingredient, in particular, an inorganic filler. Preferred inorganic fillers are glass, mica, asbestos and mixtures of asbestos and talc. Mica is especially preferred. The amount of filler may vary over a broad range. Suitable amounts are from about 1% by weight to about 40% by weight of the composition. Preferred amounts range from about 5% by weight to about 30% by weight of the composition, and particularly preferred amounts range from about 10% by weight to about 20% by weight of the composition.

The term "mica" is used herein to mean a layered silicate having an x-ray diffraction pattern d spacing about 9.6 to 10.1 A, preferably, a d spacing of about 9.9 to 10.1 A. Talc material also is a layered silicate, but has a d spacing of about 9.35 A.

Preferred micas for use in the composition of the present invention are phlogopite, muscovite, zinnwaldite and biotite, which are natural micas, and fluorophlogopite and barium disilicic, which are synthetic micas.

Particularly preferred micas for use in the present invention contain potassium and have a chemical composition of $3Al_2O_3.K_2O.6SiO_2.2H_2O$, also written $K_2Al_4(Al_2Si_6O_{20})(OH)_4$. Mica differs from talc in that talc typically does not contain potassium. Kirk-Othmer Encyclopedia of Chemical Technology, 2d Ed., Vol. 19, page 608, gives the following chemical formula for talc: $Mg_3SiO_{10}(OH)_2$. Some talcs contain varying amounts of asbestos.

Preferably, the asbestos includes amphibole and chrysotile fibers. The amphibole portion of the preferred asbestos preferably is predominantly tremolite. Thus, preferably, the tremolite is at least 50 percent of the amphibole-type asbestos and more preferably, at least 80 or 90 percent of the amphibole-type asbestos.

The asbestos filler may be mixed with talc, such as International Fiber-1, and 80/20 talc/asbestos mixture. In general, suitable asbestos/talc mixtures should comprise at least 10% by weight asbestos, preferably from about 20% to 95% by weight.

Glass fibers are readily obtained commercially and are generally sold for making reinforced plastics. These fibers are preferably 1/64 to ½ inch in length and diameters usually range from 0.00037 to 0.00051 inches.

The composition of this invention includes decabromodiphenyl oxide as a fire retardant which is present in amounts ranging from about 0.1% by weight to about 10% by weight of the composition. Preferably, the amount of decabromodiphenyl oxide ranges from about 0.25% by weight to about 6.0% by weight of the composition. Most preferably, the decabromodiphenyl oxide is present in an amount between about 0.5% by weight and about 4.0% by weight of the composition.

Preferably, the composition also contains dicyclopentadiene in small amounts to improve the flame retardancy of the composition. It has also been found that dicyclopentadiene reduces hydrogen sulfide odors during the formulation of the composition. The quantity of dicyclopentadiene varies from about 0.01% by weight to about 2.0% by weight of the composition, preferably, from about 0.05% by weight to about 1.5% by weight, and more preferably, from about 0.1% by weight to about 0.5% by weight of the composition.

The composition is useful in water impoundment; in providing floors and slabs resistant to abusive foot traffic, corrosive chemicals, and the like; in lining irrigation ditches; and in consolidating and retaining in place earth, such as on embankments, to prevent erosion. The strength retention of the compositions of this invention is important in most of these services.

A further application of the present composition is as a cement for binding sand or aggregate to form sulfur mortar or concrete. These sulfur based compositions are useful for the same purposes as portland cement products. For this utility, the cement varies from 10 to 40 percent by weight of the total sulfur-aggregate concrete.

The composition is typically applied in the molten form as, for example, by spraying or painting onto the surface desired to be covered by the composition, preferably by spraying.

BRIEF DESCRIPTION OF THE DRAWINGS

FIGS. 1 and 2 represent the oxygen index of various flame retardant compositions on a percent bromine basis.

EXAMPLES

The following examples illustrate the preparation and advantages of representative embodiments of the composition of this invention. Those familiar with the art will readily perceive alternative embodiments.

The sulfur compositions illustrated in Tables I, III and IV were prepared by charging the indicated parts by weight of sulfur to a stainless-steel beaker. This sulfur was heated until molten at a temperature of about 145° C. Then the indicated parts of plasticizer were added to the stirred, molten sulfur, and the resulting mixture was heated until homogeneous, about 10 to 15 minutes. The decabromodiphenyl oxide and then the filler were added and the entire mixture was stirred and heated at 145° C. until the filler was dispersed uniformly throughout the mixture, about 15 minutes to 1 hour.

The compositions of the present invention were tested for flame retardancy by the "Flammability of Plastics Using the Oxygen Index Method", as described in ASTM D-2863-70. This method determines the relative flammability by measuring the minimum concentration of oxygen (oxygen index) in an oxygen/nitrogen atmosphere that will just support combustion. The sample to be tested, a rod 0.25 inches in diameter and 3 inches long, is mounted in a Pyrex chimney. Then a mixture of nitrogen and oxygen is introduced at the bottom of the chimney and allowed to rise slowly past the sample at a constant rate of 4±1 cm/sec. The sample is then ignited at the top and allowed to burn in a candle-like fashion. This procedure is repeated with varying concentrations of oxygen until the concentration that just supports combustion is found. This is reported as the oxygen index.

The results of applying this test to compositions of the invention as well as to other sulfur bromine-containing flame retardant mixtures are shown in Table I. In this table the results are tabulated by weight percent of the flame retardant. The percent bromine in each composition is also given for comparison.

TABLE I

FLAME RETARDATION OF SULFUR COMPOSITES USING ORGANIC BROMINE ADDITIVES

| No. | Additive | 0.5 | 1.0 | 2.0 | 4.0 | 6.0 |
|---|---|---|---|---|---|---|
| I. | In Sulfur Composite 1[1] (Oxygen Index = 15) | | | | | |
| 1 | Decabromodiphenyl Oxide Br, % | 0.41 | 0.82 | 1.64 | 3.28 | — |
|  | Oxygen Index | 22 | 24 | 28 | 32 | — |
| 2 | Octabromodiphenyl Oxide Br, % | 0.39 | 0.79 | 1.48 | 3.16 | 4.74 |
|  | Oxygen Index | 17 | 19 | 22 | 28 | 31 |
| 3 | Pentabromodiphenyl Oxide Br, % | 0.35 | 0.71 | 1.42 | 2.84 | 4.26 |
|  | Oxygen Index | 16 | 18 | 22 | 25 | 26 |
| 4 | Hexabromobenzene Br, % | 0.43 | 0.87 | 1.74 | 3.48 | 5.22 |
|  | Oxygen Index | 17 | 18 | 20 | 28 | 33 |
| 5 | Brominated Phenoxy Alkane Br, % | 0.35 | 0.70 | 1.40 | 2.80 | 4.20 |
|  | Oxygen Index | 16 | 17 | 20 | 26 | 27 |
| 6 | 2,4,6-Tribromophenol Br, % | 0.36 | 0.72 | 1.43 | 2.86 | 4.35 |
|  | Oxygen Index | 15 | 16 | 20 | 24 | 25 |
| 7 | Tetrabromobisphenol A Br, % | 0.29 | 0.58 | 1.16 | 2.32 | 3.48 |
|  | Oxygen Index | 16 | 17 | 19 | 24 | 27 |
| II. | In Sulfur Composite 2[2] | | | | | |
| 8 | Decabromodiphenyl Oxide Br, % | 0.41 | 0.82 | 1.64 | 3.28 | — |
|  | Oxygen Index | 26 | 27 | 31 | 35 | — |

| | % | | % |
|---|---|---|---|
| [1]Sulfur | 79 | [2]Sulfur | 79 |
| PSA | 2 | PSA | 2 |
| LP-3 | 1 | Triphenyl Phosphate | 1 |
| Mica | 18 | Mica | 18 |

The data from Nos. 1–4 of Table I is presented in graphical form in FIG. 1. In this figure, the percent bromine in the composition is plotted against the oxygen index. FIG. 1 shows the superiority of decabromodiphenyl oxide as a specific flame retardant for sulfur compositions as compared to analogous flame retardant compositions on a percent bromine basis.

The data from Nos. 1 and 8 of Table I is compared with epoxy resin containing decabromodiphenyl oxide in FIG. 2. In this figure, the percent bromine in the composition is plotted against the oxygen index. FIG. 2 shows that decabromodiphenyl oxide-sulfur compositions are significantly less flammable than epoxy resin containing decabromodiphenyl oxide, as compared on a percent bromine basis.

The oxygen index for various other polymers with decabromodiphenyl oxide has been reported (Product Information Bulletin, Great Lakes Chemical Corp.) and is shown in Table II.

TABLE II

FLAME RETARDATION OF PLASTICS WITH DECABROMODIPHENYL OXIDE[1]

| No. | Polymer | Decabromo-diphenyl oxide % | Oxygen Index |
|---|---|---|---|
| 1 | Polypropylene | 0 | 18 |
|  |  | 10.7 | 22.1 |
| 2 | Polystyrene | 0 | 18.5 |
|  |  | 10.7 | 21.5 |
| 3 | ABS | 0 | 18.8 |
|  |  | 10.7 | 21.7 |
| 4 | Poly(methylmethacrylate) | 0 | 17.7 |
|  |  | 10.7 | 19.2 |
| 5 | Polyethylene | 0 | 18 |
|  |  | 25[2] | 28 |

[1]Product Information Bulletin, Great Lakes Chemical Corporation.
[2]Contains also 5% antimony trioxide.

Referring to Table II, the improvement in the oxygen index for polymers containing 10.7 percent decabromodiphenyl oxide ranges from 1.5 to 4. By comparison, Table I shows that 4.0 percent decabromodiphenyl oxide in a sulfur composition raises the oxygen index from a value of 15 to 32, a net increase of 17. The magnitude of this improvement was wholly unexpected in view of the known performance of various other plastics.

Table III represents flame retardation data showing the synergistic improvement in flame retardancy due to the additional presence of dicyclopentadiene or cyclooctadiene in the sulfur composition of the present invention. At very low concentrations, the incorporation of these materials gives a significant increase in the oxygen index of a sulfur-decabromodiphenyl oxide composition.

The compositions of the present invention additionally possess improved crazing resistance when used as coating compositions. In order to test crazing resistance, 6 by 4 inch concrete bricks were covered to a ¼ inch depth with a molten layer of a sulfur composition of the instant invention. Upon hardening, the bricks were tested on a 24 hour temperature cycle according to the following procedure:

(1) 8 hours at 70° C.

(2) 15 hours in a freezer at 0° C. The freezing cycle required 2 hours to reach 0° C., the temperature was held at 0° C. for 8 hours, and then allowed to warm up to 10°–15° C. over a period of 5 hours. After each cycle, the bricks were examined for crazing, cracking or delamination under a 7x magnifier. The results are recorded in Table IV for various sulfur compositions. Testing was stopped after 100 cycles.

TABLE III

FLAME RETARDATION WITH DECABROMODIPHENYL OXIDE SYNERGISTIC EFFECT WITH DICYCLOPENTADIENE

| No. | Sulfur Composite[1] % | Decabromo-diphenyl oxide, % | DCP[2], % | Oxygen Index (ASTM D 2863) |
|---|---|---|---|---|
| 1 | 100.0 | — | — | 15 |
| 2 | 99.5 | 0.5 | — | 22 |
| 3 | 99.0 | 1.0 | — | 24 |
| 4 | 98.0 | 2.0 | — | 28 |
| 5 | 96.0 | 4.0 | — | 32 |
| 6 | 99.4 | 0.5 | 0.1 | 30 |
| 7 | 98.9 | 1.0 | 0.1 | 32 |
| 8 | 97.9 | 2.0 | 0.1 | 36 |
| 9 | 95.9 | 4.0 | 0.1 | 37 |
| 10 | 99.0 | 1.0 | — | 24 |
| 11 | 98.95 | 1.0 | 0.05 | 29 |
| 12 | 98.9 | 1.0 | 0.1 | 32 |
| 13 | 98.8 | 1.0 | 0.2 | 33 |
| 14 | 98.5 | 1.0 | 0.5 | 35 |
| 15 | 98.0 | 1.0 | 1.0 | 37 |
| 16 | 99.0 | — | 1.0 | 22 |
| 17 | 98.9 | 1.0 | 0.1[3] | 31 |

| [1]Sulfur Composite | % |
|---|---|
| Sulfur | 79 |
| PSA | 2 |
| LP-3 | 1 |
| Mica | 18 |

[2]Dicyclopentadiene.
[3]Cyclooctadiene.

TABLE IV

CRAZING RESISTANCE OF SULFUR COMPOSITES FORMULATED WITH DECABROMODIPHENYL OXIDE

| | Composition, % | | | Cycling Test (70° C./0° C.) Number of Cycles | |
|---|---|---|---|---|---|
| No. | Sulfur Composite[1] | Decabromo[2] | DCP[3] | Failure | No Failure |
| 1 | A | 100.00 | — | — | 3, 3, 3 | |
| 2 | A | 99.5 | 0.5 | — | | 100, 100, 100 |
| 3 | B | 100.00 | — | — | 6, 6, 6 | |
| 4 | B | 99.5 | 0.5 | — | | 100, 100, 100 |
| 5 | B | 99.4 | 0.5 | 0.1 | 65 | 100, 100, 100, 100, 100 |
| 6 | B | 99.15 | 0.75 | 0.1 | | 100, 100, 100 |
| 7 | B | 96.00 | 4.0 | — | | 100, 100, 100 |
| 8 | C | 100.00 | — | — | | 100, 100, 100 |
| 9 | C | 99.5 | 0.5 | — | | 100, 100, 100 |

| [1]Sulfur Composite | A | B | C |
|---|---|---|---|
| Sulfur, % | 82.5 | 79.0 | 79.0 |
| Phenol-Sulfur Adduct, % | 1.0 | 2.0 | 2.0 |
| Thiokol LP-3, % | 0.5 | 1.0 | — |
| Triphenyl Phosphate, % | — | — | 1.0 |
| Mica filler, % | 16.0 | 18.0 | 18.0 |

[2]Decabromodiphenyl oxide
[3]Dicyclopentadiene

I claim:

1. A plasticized sulfur composition comprising at least 50% by weight sulfur, from about 0.05% to about 25% by weight sulfur plasticizer, from about 1.0% to about 40% by weight inorganic filler, and from about 0.1% to about 10% by weight decabromodiphenyl oxide.

2. A composition according to claim 1, comprising from about 60% to about 98% by weight sulfur, from about 0.2% to about 5.0% by weight sulfur plasticizer, from about 5% to about 30% by weight inorganic filler, and from about 0.25% to about 6.0% by weight decabromodiphenyl oxide.

3. A composition according to claim 2, comprising from about 70% to about 97% by weight sulfur, from about 1.0% to about 4.0% by weight sulfur plasticizer, from about 10% to about 20% by weight inorganic filler, and from about 0.5% to about 4.0% by weight decabromodiphenyl oxide.

4. A composition according to claim 1, further comprising about 0.01% to about 2.0% by weight dicyclopentadiene.

5. A composition according to claim 2, further comprising about 0.05% to about 1.5% by weight dicyclopentadiene.

6. A composition according to claim 3, further comprising about 0.1% to about 0.5% by weight dicyclopentadiene.

7. A composition according to claim 1, wherein the sulfur plasticizer is selected from the group consisting of aliphatic polysulfides, aromatic polysulfides, and mixtures thereof.

8. A composition according to claim 1, wherein the inorganic filler is mica.

9. A plasticized sulfur composition comprising about 80% by weight sulfur, about 2.0% by weight of an aromatic polysulfide formed by reacting one mol of phenol with at least two mols of sulfur, about 1.0% by weight of a linear aliphatic polysulfide having the recurring unit:

$$-S_xCH_2CH_2OCH_2OCH_2CH_2S_x-,$$

about 18% by weight mica, about 0.5% by weight decabromodiphenyl oxide, and about 0.1% by weight dicyclopentadiene.

* * * * *